（12）United States Patent
Simnacher

(10) Patent No.: US 7,918,648 B1
(45) Date of Patent: Apr. 5, 2011

(54) WINDPOWER GENERATOR APPARATUS

(76) Inventor: Larry W. Simnacher, Bay City, TX (US)

( * ) Notice: Subject to any disclaimer, the term of this patent is extended or adjusted under 35 U.S.C. 154(b) by 760 days.

(21) Appl. No.: 11/617,581

(22) Filed: Dec. 28, 2006

(51) Int. Cl.
*F03D 3/06* (2006.01)
(52) U.S. Cl. .................. 416/111; 416/119; 416/132 B
(58) Field of Classification Search .............. 415/4.2, 415/4.4, 60, 130, 907; 416/111, 119, 132 B, 416/131; 290/44, 55
See application file for complete search history.

(56) References Cited

U.S. PATENT DOCUMENTS

| 591,775 | A | | 10/1897 | Peterson | |
|---|---|---|---|---|---|
| 3,912,937 | A | * | 10/1975 | Lesser | 290/43 |
| 4,134,710 | A | * | 1/1979 | Atherton | 416/117 |
| 4,408,955 | A | * | 10/1983 | Wagle et al. | 416/119 |
| 4,486,143 | A | | 12/1984 | McVey | |
| 4,551,631 | A | | 11/1985 | Trigilio | |
| 4,678,394 | A | * | 7/1987 | Willoughby | 415/141 |
| 4,679,985 | A | * | 7/1987 | Worms | 416/119 |
| 5,126,584 | A | | 6/1992 | Ouellet | |
| 6,926,491 | B2 | * | 8/2005 | Migler | 415/4.4 |
| 6,942,454 | B2 | | 9/2005 | Ohlmann | |
| 7,365,448 | B2 | * | 4/2008 | Stephens | 290/55 |

* cited by examiner

*Primary Examiner* — Ninh H Nguyen
(74) *Attorney, Agent, or Firm* — Egbert Law Offices PLLC

(57) ABSTRACT

A windpower generator apparatus has a horizontal shaft, a first arm extending outwardly of the shaft, a second arm extending outwardly of the shaft in spaced relationship to the first arm, a third arm extending outwardly of the shaft in spaced radial relationship to the first and second arms, a first plurality of vanes pivotally affixed to a first arm, a second plurality of vanes pivotally affixed to said second arm, a third plurality of vanes pivotally affixed to said third arm, and a generator cooperative with the shaft for producing electrical energy relative to a rotation of the shaft. Each of the vanes is movable between a first position aligned with the arm and a second position extending transverse to the arm. The vanes are movable between the first and second positions by actions of gravity during the rotation of the shaft.

14 Claims, 1 Drawing Sheet

WINDPOWER GENERATOR APPARATUS

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates to apparatus and systems for the generation of electricity by the action of wind. More particularly, the present invention relates to windpower generators having a generally horizontal shaft. More particularly, the present invention relates to windpower generators in which of the arms of the windpower generator have vanes thereon which pivot by action of gravity and wind.

2. Description of Related Art Including Information Disclosed Under 37 CFR 1.97 and 37 CFR 1.98

Wind energy generation is becoming increasingly popular as a means for producing energy. The production of energy from the motion of wind is a safe, clean and efficient power source. As the blades of the wind power generator rotate, they correspondingly rotate the shaft of a turbine so as to produce energy. This energy can be delivered for personal or commercial use. Large wind energy farms are now being built wherein a great deal of wind energy can be obtained in relatively windy area of the country.

One of the major problems associated with wind energy generators is the action of the drag of the wind on the action of the blade. For example, when one of the blades of a wind energy generator is capturing the wind another of the blades actually creates drag which inhibits the free rotation of the blades. As such, it is extremely desirable to minimize the drag on the blade during the rotation of the blades by action of the wind.

In the past, wind energy generators have not utilized the action of gravity so as to effect the minimization of drag on the blades. Since virtually all wind energy generators have the blades mounted to a horizontal shaft and which all of the blades face the wind, it is virtually impossible to minimize the action of drag without a rotation of the blades during the rotation of the shaft. In other words, when the full face of the blade faces the wind, drag will be inherent. However, if it were possible to rotate blades so that the thin edge of one of the blades faces the wind while another of the blades captures the wind, then drag can be minimized. Unfortunately, such systems for the simultaneously rotation of the individual blades during the rotation of the shaft are exceedingly complex and expensive. As such, it would be desirable to minimize the drag-producing profile of the individual blades during the rotation of the shaft so as to, accordingly, minimize drag.

In the past, various patents have issued relating to shuttered wind energy generators which adjust the orientation of the individual shutter during the rotation of the shaft of the generator. U.S. Pat. No. 5,126,584 describes a wind energy generator that is configured so as to rotate about a vertical shaft. Each vane of the wind energy generator is formed of an outer stationary shutter and a movable inner shutter. The movable inner shutter is capable of pivoting about it longitudinal axis. A control mechanism is provided so as to adjust angular orientation of the movable shaft.

U.S. Pat. No. 4,551,631 teaches a wind energy generating plant that is positioned on a vertical axis. A plurality of shutter assemblies are disposed in a circular orientation around each turbine assembly and are independently operable for causing wind current to be directed thereby for rotating the turbine assemblies. Five wall elements extend outwardly tangential to the periphery defined by the shutter assemblies and intercept the wind current and direct the wind currents toward the shutter assemblies. A control system for the manipulation of shutters relative to the wind conditions is also described.

U.S. Pat. No. 591,775, issued on Oct. 12, 1987, is an early patent describing the use of shutter assemblies for a windmill. The shutter assemblies are arranged about a vertical axis rotation. A mechanism is provided to control the orientation of the blades such that as the windmill rotates, the flat sides of the shutters will be presented to receive the full force of the wind. As they move rearwardly and forwardly, the shutters will gradually turn to present their edges to the wind so as to avoid any reduction in the rotation speed of the windmill. As the blades pass across the rear portions of the windmill into the direction of the wind, the blades will be turned at different angles so as to receive the wind and assist in the rotation of the windmill.

U.S. Pat. Nos. 4,486,143 and 6,942,454 each describe deflector panels which serve to control the volume of air which bypasses each panel so as to avoid turbulence adjacent the driving vanes of the turbine.

It is an object of the present invention to provide a windpower generator which produces electrical energy by the action of wind.

It is another object of the present invention to provide a windpower generator which minimizes the drag affecting the rotation of the blades.

It is a further object of the present invention to provide a wind energy generator in which the orientation of the vanes of the wind energy generator are controlled by the action of wind and gravity.

It is a further object of the present invention to provide a wind energy generator which is reliable, cost-effective and energy efficient.

These and other objects and advantages of the present invention will become apparent from a reading of the attached specification and appended claims.

BRIEF SUMMARY OF THE INVENTION

The present invention is a windpower generator apparatus that comprises a shaft, a first arm extending outwardly of the shaft, a second arm extending outwardly of the shaft in spaced radial relationship to the first arm, a third arm extending outwardly of the shaft in spaced radial relationship to the first and second arms, a first plurality of vanes extending outwardly of the first arm, a second plurality of vanes extending outwardly of the second arm, and a third plurality of vanes extending outwardly of the third arm, and a generating means cooperative with the shaft for producing electrical energy relative to a rotation of the shaft. Each of the first plurality of vanes is movable between a first position aligned with first arm and a second position extending transverse to the first arm. Each of the second plurality of vanes is movable between a first position aligned with the second arm and a second position extending generally transverse to the second arm. Each of the third plurality of vanes is movable between a first position aligned with the third arm and a second position extending generally transverse to the third arm.

In the present invention, each of the first arm and the second arm and the third arm extend transverse to the shaft. Each of the first plurality of vanes and the second plurality of vanes and the third plurality of vanes extend in generally parallel relationship to the shaft. The first plurality of vanes and the second plurality of vanes and the third plurality of vanes are movable between the first position and the second position by action of wind and gravity.

Each of the first arm and the second arm and the third arm comprise a first rod affixed to the shaft and extending outwardly therefrom, and a second rod affixed to the shaft and extending outwardly therefrom in spaced parallel relationship to the first arm. The plurality of vanes are pivotally affixed to the first and second rods. The shaft has a hub affixed thereto. Each of the first arm and the second arm and the third arm are attached to the hub.

The first plurality of vanes are in the first position when the plurality of vanes of the one of the second and the third pluralities of vanes are in the second position. The first plurality of vanes is in the first position when in a position above the shaft. The other of the pluralities of vanes are in the second position when in a position below the shaft. Each of the vanes of the first plurality of vanes overlies an edge of an adjacent vane when in the first position. The vanes define a space with respect to an adjacent vane when they are in the second position.

In the preferred embodiment of the present invention, each of the vanes of the pluralities of vanes have an airfoil shape. Also, in the preferred embodiment of the present invention, the shaft extends horizontally.

DETAILED DESCRIPTION OF THE INVENTION

Figure 1:
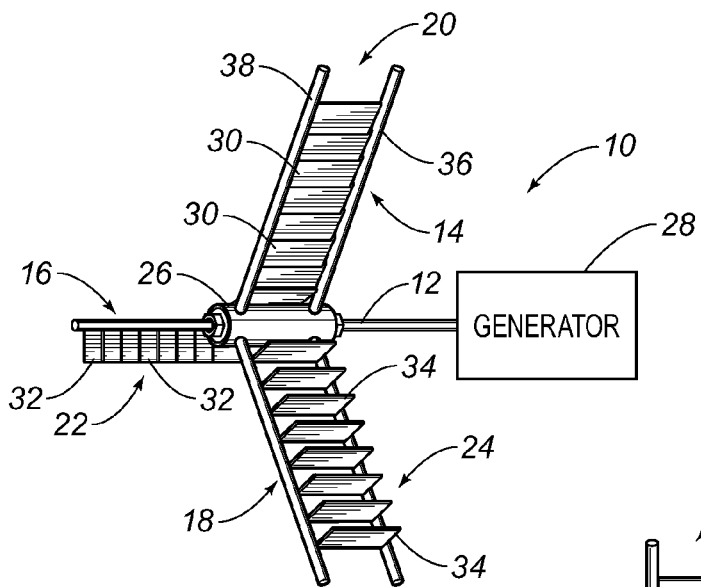
FIG. 1 is a perspective view of the windpower generator apparatus of the present invention.

Referring to FIG. 1, there is shown the windpower generator apparatus 10 in accordance with the preferred embodiment of the present invention. The windpower generator apparatus 10 includes a shaft 12, a first arm 14 extending outwardly of the shaft 12, a second arm 16 extending outwardly of the shaft in spaced radial relationship to the first arm 14, and a third arm 18 outwardly extending of the shaft 12 in spaced radial relationship to the first arm 14 and the second arm 16. A plurality of vanes 20 are pivotally affixed to the first arm 14. A second plurality of vanes 22 are pivotally attached to the second arm 16. A third plurality of vanes 24 are pivotally affixed to the third arm 18. The arms 14, 16 and 18 are directed affixed to the hub 26 which is, in turn, affixed over the horizontal shaft 12. The shaft 12 is operatively connected to a generator 28. As such, as the arms 14, 16 and 18 rotate, the hub 26 will corresponding rotate the shaft 12 which produces electrical energy from the turbine-like action of the generator 28.

Importantly, as can be seen in FIG. 1, the first plurality of vanes 20 is in a position generally aligned with the first arm 14. As such, they establish a generally planar relationship with the first arm 14. In this position, the first plurality of vanes 20 is particularly configured so as to fully receive the force of the wind imparted thereto. Each of the individual vanes 30 are separately pivotally affixed to the arm 14. Since the first arm 14 is in a position above the shaft 12 in a generally upward orientation, the force of gravity and wind will cause the individual vanes of the first plurality of vanes 20 to drop downwardly so as to overlie each other and to present a full surface for the receipt of wind thereagainst. When the shift is oriented vertically, the force of the wind will automatically cause the movement of the vanes.

The second plurality of vanes 22 shows the separate vanes 32 thereof as extending somewhat transverse to the longitudinal axis of the arm 16. Since the individual vanes 32 of the second plurality of vanes 22 are rearwardly of the first arm 14 and the second arm 18, the vanes 32 will not receive wind blowing in the direction of the first arm 14. Action of wind is generally blocked from acting on the vanes 32 by the hub 26 and by the vanes associated with the arms 14 and 18. The action of gravity and wind will cause the individual vanes 32 to pivot generally downwardly during the rotation of the shaft 12.

The individual vanes 34 of the third plurality of vanes 24 are pivotally attached to arm 18. As can be seen, in this second position, the individual vanes 34 define a space with respect to an adjacent vane 34. The vanes 34 pivot into this second position by the action of gravity. Since the vanes 34 are located below the shaft 12, they will rotate so as to open to the wind. As a result, the wind will blow rather freely between each of the vanes 34 so as to minimize the drag affecting the rotation of the shaft 12 of the windpower generator apparatus 10.

In FIG. 1, it can be seen that the first arm 14 includes a first rod 36 and a second rod 38. The first rod 36 is affixed to the hub 26. The second rod 38 is affixed to the hub 26 in spaced parallel relationship to the first rod 36. The individual vanes 30 are pivotally affixed along one edge to each of the rods 36 and 38. In the preferred embodiment of the present invention, a pair of rods 36 and 38 are utilized. However, within the concept of the present invention, it is possible that only a single rod could be utilized in association with the vanes 30. Additionally, it is possible that a single rod could be positioned generally centrally of each of the first plurality of vanes 20 so as to cause the requisite pivotal action in accordance with the present invention. The second arm 16 and third arm 18 also have a pair of parallel spaced rods which support the respective 32 and 34.

Figure 2:
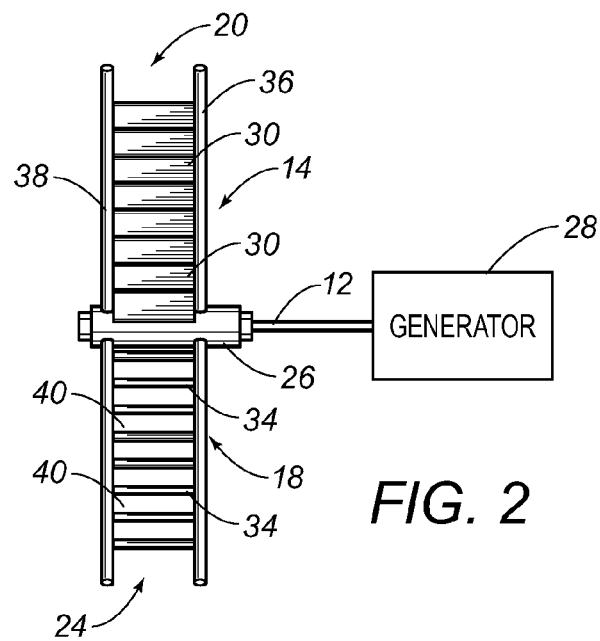
FIG. 2 is a frontal view as viewed from the direction of wind approaching the wind energy generator of the present invention.

As can be seen in FIG. 2, the vanes 30 of the first plurality of vanes 20 are in their first position pivoted downwardly so as to present a closed surface to oncoming wind. The vanes 30 of the first plurality of vanes 20 pivot to this first position by action of wind and gravity. Correspondingly, the vanes 34 of the third plurality of vanes 24 are pivoted to a second position in which each of the vanes 34 opens generally parallel to each other so as to define a space 40 between adjacent vanes. This movement to the second position is accomplished also by the action of gravity.

Through the configuration, as illustrated in FIG. 2, oncoming wind fully affects the vanes 30 when they are in their first position. The first plurality of vanes 20 are configured so that each of the individual vanes 30 overlie the edge of an adjacent vane so as to present a closed surface. As such, the first plurality of vanes 20 will receive the full force of the wind thereagainst. At the same time, the third plurality of vanes 24 defines an open space 40 between the adjacent vanes 34 so as to virtually eliminate drag effects by allowing the wind to blow freely therethrough. Since the second plurality of vanes 22 on the second arm 16 are obscured by the hub 26 and the first plurality of vanes 20, there would be only minimal drag effects affecting the second arm 16. As a result, the present invention is able to optimize the power produced from oncoming wind by minimizing the drag effects.

Figure 3:
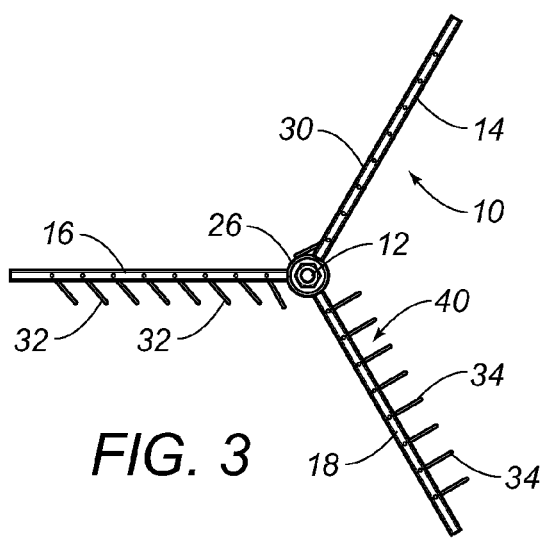
FIG. 3 is an end view of the wind energy generator of the present invention.

FIG. 3 shows an end view of the windpower generator apparatus 10 of the present invention. In FIG. 3, the generator 28 is omitted. In FIG. 3, it can be seen that the first arm 14 is in a position above the shaft 12. The individual vanes 30 on arm 14 are in a position generally aligned with the arm 14. The second arm 16 is located rearwardly of the hub 26 on shaft 12. The individual vanes 32 are pivotally connected to arm 16 so as to pivot downwardly by the action of gravity and wind. As the shaft 12 rotates, the third arm 18 has its individual vanes 34 fully opened so as to extend transverse the arm 18 and define the space 40 between the adjacent vanes 34. This pattern of opening and closing of the individual vanes continues throughout the rotation of the shaft 12. As such, the present invention is able to optimize the receipt of wind energy and, as such, optimize the production of electrical energy from the generator. Drag is very much minimized through the configuration of the windpower generator apparatus of the present invention. Since the vanes open and close by the action of wind and gravity, no power is consumed by the vanes during movement. Also, within the concept of the present invention, it is possible to extend the shaft vertically such that the movement of the vanes occurs only by the action of wind.

Figure 4:
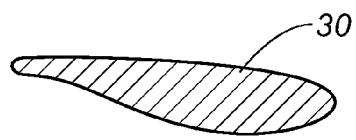
FIG. 4 is a cross-sectional view of an individual vane of the wind energy generator of the present invention.

To further optimize the impact of wind energy, each of the individual vanes has a generally airfoil shape. FIG. 4 shows an individual vane 30. The individual vane 30 has its airfoil shape so as to maximize lift and minimize drag of the wind across an individual vane.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. A windpower generator apparatus comprising:
   a horizontal shaft;
   a first arm extending outwardly of said shaft;
   a second arm extending outwardly of said shaft and radially spaced by 120° from said first arm;
   a third arm extending outwardly of said shaft and radially spaced by 120° from said first arm and by 120° from said second arm;
   a first plurality of vanes extending outwardly of said first arm, each of said first plurality of vanes being movable by gravity in a range only between a first position aligned with said first arm and a second position extending generally transverse to said first arm;
   a second plurality of vanes extending outwardly of said second arm, each of said second plurality of vanes movable by gravity in a range only between a first position aligned with said second arm and a second position extending transverse to said second arm;
   a third plurality of vanes extending outwardly of said third arm, each of said third plurality of vanes movable by gravity in a range only between a first position aligned with said third arm and a second position extending generally transverse to said third arm, said first plurality of vanes being in said first position when said plurality of vanes of said one of said second plurality of vanes and said third plurality of vanes is in said second position, said first plurality of vanes being in said first position when in a position above said shaft, said one of said second and third pluralities of vanes being in said second position when in a position below said shaft; and
   a generating means cooperative with said shaft for producing electrical energy relative to a rotation of said shaft.

2. The apparatus of claim 1, each of said first arm and said second and said third arm extending transverse to a longitudinal axis of said shaft.

3. The apparatus of claim 1, each of said first arm and said second arm and said third arm comprising:
   a first rod affixed to said shaft and extending outwardly therefrom; and
   a second rod affixed to said shaft and extending outwardly therefrom in spaced parallel relationship to said first rod, the plurality of vanes being pivotally affixed to said first and second rods.

4. The apparatus of claim 1, said shaft having a hub affixed thereover, said first arm and said second arm and said third arm being affixed to said hub.

5. A windpower generator apparatus comprising:
   a horizontal shaft;
   a first arm extending outwardly of said shaft;
   a second arm extending outwardly of said shaft and radially spaced by 120° from said first arm;
   a third arm extending outwardly of said shaft and radially spaced by 120° from said first arm and by 120° from said second arm;
   a first plurality of vanes extending outwardly of said first arm, each of said first plurality of vanes being movable by gravity in a range only between a first position aligned with said first arm and a second position extending generally transverse to said first arm;
   a second plurality of vanes extending outwardly of said second arm, each of said second plurality of vanes movable by gravity in a range only between a first position aligned with said second arm and a second position extending transverse to said second arm;
   a third plurality of vanes extending outwardly of said third arm, each of said third plurality of vanes movable by gravity in a range only between a first position aligned with said third arm and a second position extending generally transverse to said third arm, said first plurality of vanes being in said first position when said plurality of vanes of said one of said second plurality of vanes and said third plurality of vanes is in said second position, each of said vanes of said first plurality of vanes overlying an edge of an adjacent vane when in said first position; and
   a generating means cooperative with said shaft for producing electrical energy relative to a rotation of said shaft.

6. The apparatus of claim 5, each of said vanes of one of said second and third pluralities of vanes defining a space within an adjacent vane when in said second position.

7. The apparatus of claim 5, each of said vanes of said first plurality of vanes and said second plurality of vanes and said third plurality of vanes having an airfoil shape.

8. A windpower generator apparatus comprising:
a horizontal shaft;
a first arm extending outwardly of said shaft;
a second arm extending outwardly of said shaft in spaced radial relationship to said first arm;
a first plurality of vanes affixed to and extending outwardly of said first arm, said first plurality of vanes movable by gravity between a first position in which each of said first plurality of vanes overlies a surface of an adjacent vane and a second position in which each of said first plurality of vanes defines an open space with the adjacent vane, each of said first plurality of vanes being a generally inflexible surface throughout the movement between said first position and said second position, each of said first plurality of vanes being of a generally planar unitary construction;
a second plurality of vanes affixed to and extending outwardly of said first arm, said second plurality of vanes movable by gravity between a first position in which each of said second plurality of vanes overlies a surface of an adjacent vane and a second position in which each of said second plurality of vanes defines an open space with the adjacent vane, each of said second plurality of vanes being a generally inflexible surface throughout the movement of between said first position and said second position, each of said second plurality of vanes being of a generally planar unitary construction; and
a generating means cooperative with said shaft for producing electrical energy relative to a rotation of said shaft.

9. The apparatus of claim 8, further comprising:
a third arm extending outwardly of said shaft in spaced radial relationship to said first and second arm; and
a third plurality of vanes pivotally affixed to and extending outwardly of said third arm, said third plurality of vanes movable between a first position in which each of said third plurality of vanes overlies a surface of an adjacent vane and a second position in which each of said third plurality of vanes defines an open space with respect to an adjacent vane.

10. The apparatus of claim 8, each of said first and second arms comprising:
a first rod affixed to said shaft and extending outwardly therefrom; and
a second rod affixed to said shaft and extending outwardly therefrom in spaced parallel relationship to said first rod, the plurality of vanes pivotally affixed to said first and second rods.

11. The apparatus of claim 8, said first plurality of vanes being in said first position when the plurality of vanes of one of said second plurality of vanes is in said second position.

12. The apparatus of claim 11, said first plurality of vanes being in said first position when in a position above said shaft, said one of said second and third pluralities of vanes being in said second position when in a position below said shaft.

13. The apparatus of claim 8, each of said vanes of said first plurality of vanes and said second plurality of vanes having airfoil shape.

14. A windpower generator apparatus comprising:
a horizontal shaft;
a first arm extending outwardly of said shaft;
a second arm extending outwardly of said shaft and radially spaced by 120° from said first arm;
a third arm extending outwardly of said shaft and radially spaced by 120° from said second arm;
a first plurality of vanes pivotally affixed to said first arm, each of said first plurality of vanes movable by action of gravity in a range only between a first position aligned with said first arm and a second position extending generally transverse to said first arm;
a second plurality of vanes extending pivotally affixed to said second arm, each of said second plurality of vanes movable by action of gravity in a range only between a first position aligned with said second arm and a second position extending transverse to said second arm;
a third plurality of vanes pivotally affixed to said third arm, each of said third plurality of vanes movable by action of gravity in a range only between a first position aligned with said third arm and a second position extending transverse to said second arm; and
a generating means cooperative with said shaft for producing electrical energy relative to a rotation of said shaft, each of said first plurality of vanes being movable between said first position in which each of said plurality of vanes overlies an adjacent vane and a second position in which each of said first plurality of vanes defines an open space with the adjacent vane, each of said plurality of vanes movable between said first position in which each of said plurality of vanes overlies an adjacent vane and a second position in which each of second plurality of vanes defines an open space with the adjacent vane, said first plurality of vanes being in said first position when in a position above said shaft, said second plurality of vanes being in said second position when in a position below said shaft.

* * * * *